United States Patent
Moriki et al.

(10) Patent No.: US 10,635,873 B2
(45) Date of Patent: *Apr. 28, 2020

(54) VIDEO SIGNAL MONITORING METHOD, VIDEO SIGNAL MONITORING DEVICE, AND DISPLAY DEVICE

(71) Applicant: NEC Display Solutions, Ltd., Tokyo (JP)

(72) Inventors: Yoshinori Moriki, Tokyo (JP); Yutaka Arai, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/215,436

(22) Filed: Dec. 10, 2018

(65) Prior Publication Data

US 2019/0108371 A1 Apr. 11, 2019

Related U.S. Application Data

(63) Continuation of application No. 15/558,535, filed as application No. PCT/JP2016/057127 on Mar. 8, 2016, now Pat. No. 10,192,088.

(30) Foreign Application Priority Data

Mar. 26, 2015 (JP) .................. 2015-063638

(51) Int. Cl.
*H04H 60/40* (2008.01)
*G06K 7/10* (2006.01)
(Continued)

(52) U.S. Cl.
CPC .............. *G06K 7/1092* (2013.01); *G01J 1/44* (2013.01); *G01J 3/506* (2013.01); *G06F 3/14* (2013.01);
(Continued)

(58) Field of Classification Search
CPC ......... H04H 60/37; H04H 60/40; H04H 60/31
(Continued)

(56) References Cited

U.S. PATENT DOCUMENTS 10,192,088 B2 * 1/2019 Moriki ..................... G06K 9/00
2003/0210338 A1 11/2003 Matsuoka
(Continued)

FOREIGN PATENT DOCUMENTS

JP 2011-095804 A 5/2011
JP 2013-024908 A 2/2013
(Continued)

OTHER PUBLICATIONS

Office Action (Ex Parte Quayle Action) in U.S. Appl. No. 15/558,535 dated Apr. 18, 2018.
(Continued)

*Primary Examiner* — Ahshik Kim
(74) *Attorney, Agent, or Firm* — McGinn I. P. Law Group, PLLC (57) ABSTRACT

A video signal monitoring method includes detecting at least one of luminance or chromaticity in a predetermined region among regions of a video displayed on a display device; converting the at least one of detected luminance or chromaticity into video identification information for identifying the video; and outputting the video identification information and a time at which the video was displayed.

20 Claims, 8 Drawing Sheets

(51) Int. Cl.
    *G06F 3/14*     (2006.01)
    *G01J 1/44*     (2006.01)
    *G01J 3/50*     (2006.01)
    *G09G 5/00*     (2006.01)
    *G06K 9/00*     (2006.01)
    *G06K 9/20*     (2006.01)
    *G06K 9/46*     (2006.01)

(52) U.S. Cl.
    CPC ....... G06K 7/1095 (2013.01); G06K 7/10732 (2013.01); *G06K 9/00744* (2013.01); *G06K 9/209* (2013.01); *G06K 9/4652* (2013.01); *G06K 9/4661* (2013.01); *G09G 5/00* (2013.01); *G09G 2330/12* (2013.01); *G09G 2360/145* (2013.01); *G09G 2370/04* (2013.01); *G09G 2380/06* (2013.01)

(58) Field of Classification Search
    USPC ...................................................... 725/20, 19
    See application file for complete search history.

(56) References Cited

U.S. PATENT DOCUMENTS

| | | | | |
|---|---|---|---|---|
| 2005/0185093 A1* | 8/2005 | Nashida | ................. | G09G 5/006 348/558 |
| 2006/0290818 A1* | 12/2006 | Asamura | ................. | H04N 9/78 348/663 |
| 2007/0083883 A1 | 4/2007 | Deng | | |
| 2011/0051004 A1 | 3/2011 | Mori | | |
| 2014/0152786 A1 | 6/2014 | Nicholson | | |
| 2017/0132766 A1 | 5/2017 | Ono | | |
| 2017/0277955 A1 | 9/2017 | Liu | | |
| 2018/0013978 A1* | 1/2018 | Duan | ....................... | H04N 7/01 |

FOREIGN PATENT DOCUMENTS

| | | | |
|---|---|---|---|
| JP | | 2015-045733 A | 3/2015 |
| WO | WO | 2009/104584 A1 | 8/2009 |

OTHER PUBLICATIONS

Notice of Allowance in U.S. Appl. No. 15/558,535 dated Sep. 18, 2018.

International Search Report (ISR) (PCT Form PCT/ISA/210), in PCT/JP2016/057127, dated Jun. 7, 2016.

Japanese Decision to Grant a Patent, dated Nov. 29, 2018, in Japanese Application No. 2017-508181 and English Translation thereof.

* cited by examiner

VIDEO SIGNAL MONITORING METHOD, VIDEO SIGNAL MONITORING DEVICE, AND DISPLAY DEVICE

The present application is a Continuation Application of U.S. patent application Ser. No. 15/558,535, filed on Sep. 14, 2017, which is based on Japanese Patent Application No. 2015-063638 filed on Mar. 26, 2015, the contents of which is incorporated herein by reference in its entirety.

TECHNICAL FIELD

Background Art

In order to promote the replacement of an advertisement means using a conventional printing medium with another advertisement means, an advertisement display device for displaying a video of advertisement content on a large-sized display device has been developed. When advertisement content is displayed by this advertisement display device, it is very important for an advertisement provider, who supplies advertisement content and pays an advertisement fee, to confirm that the intended content is displayed as desired. It is also important for the advertisement displayer, who displays a medium, to confirm that there is a situation in which the intended content is displayed as desired.

In order to deal with these confirmations, Patent Document 1 discloses a display device capable of verifying a situation where the intended content is displayed as desired by providing a camera outside the display device so as to record advertisement content displayed on the display device.

PRIOR ART DOCUMENT

Patent Document

[Patent Document 1]
Patent Document 1: Japanese Unexamined Patent Application, First Publication No. 2011-95804

DISCLOSURE OF INVENTION

Problems to be Solved by the Invention

However, in the display device described in Patent Document 1, it is necessary to install the camera outside the display device with a certain distance away therefrom, and there is a problem that the manufacturing costs of a display system are high because the camera is expensive.

The present invention has been made in view of the above-described points, and a main objective of the present invention is to provide a video signal monitoring method and the like for solving the above-described problem.

Means for Solving the Problem

According to the present invention for solving the above-described problem, there is provided a video signal monitoring method including: a detecting process in which a sensor installed in a display device detects luminance and/or chromaticity in a predetermined region among regions of a video displayed on the display device; a sensing result converting process of converting the detected luminance and/or chromaticity into video identification information for identifying the video; and a sensing result reading process of outputting the video identification information and a clock time at which the video was displayed.

Also, according to the present invention, there is provided a video signal monitoring device including: a sensor installed in a display device and configured to detect luminance and/or chromaticity in a predetermined region among regions of a video displayed on the display device; a sensing result converting unit configured to convert the detected luminance and/or chromaticity into video identification information for identifying the video; a time measuring unit configured to acquire a clock time or a period of time at or during which the video was displayed; and a sensing result reading unit configured to output the video identification information and the clock time or the period of time.

Also, according to the present invention, there is provided a display device including: a sensing result converting unit configured to convert luminance and/or chromaticity detected by a sensor installed in the display device in a predetermined region among regions of a video displayed on the display device into video identification information for identifying the video; a time measuring unit configured to acquire a clock time or a period of time at or during which the video was displayed; and a sensing result reading unit configured to output the video identification information and the clock time or the period of time.

Effects of the Invention

According to the present invention, an ID (video identification information) is added to a video in order to identify the video and to indicate details of content of the video, so that it is possible to perform the verification of display content by replacing an external camera with a cheap small sensor without using the external camera.

EMBODIMENTS FOR CARRYING OUT THE INVENTION

Figure 1:
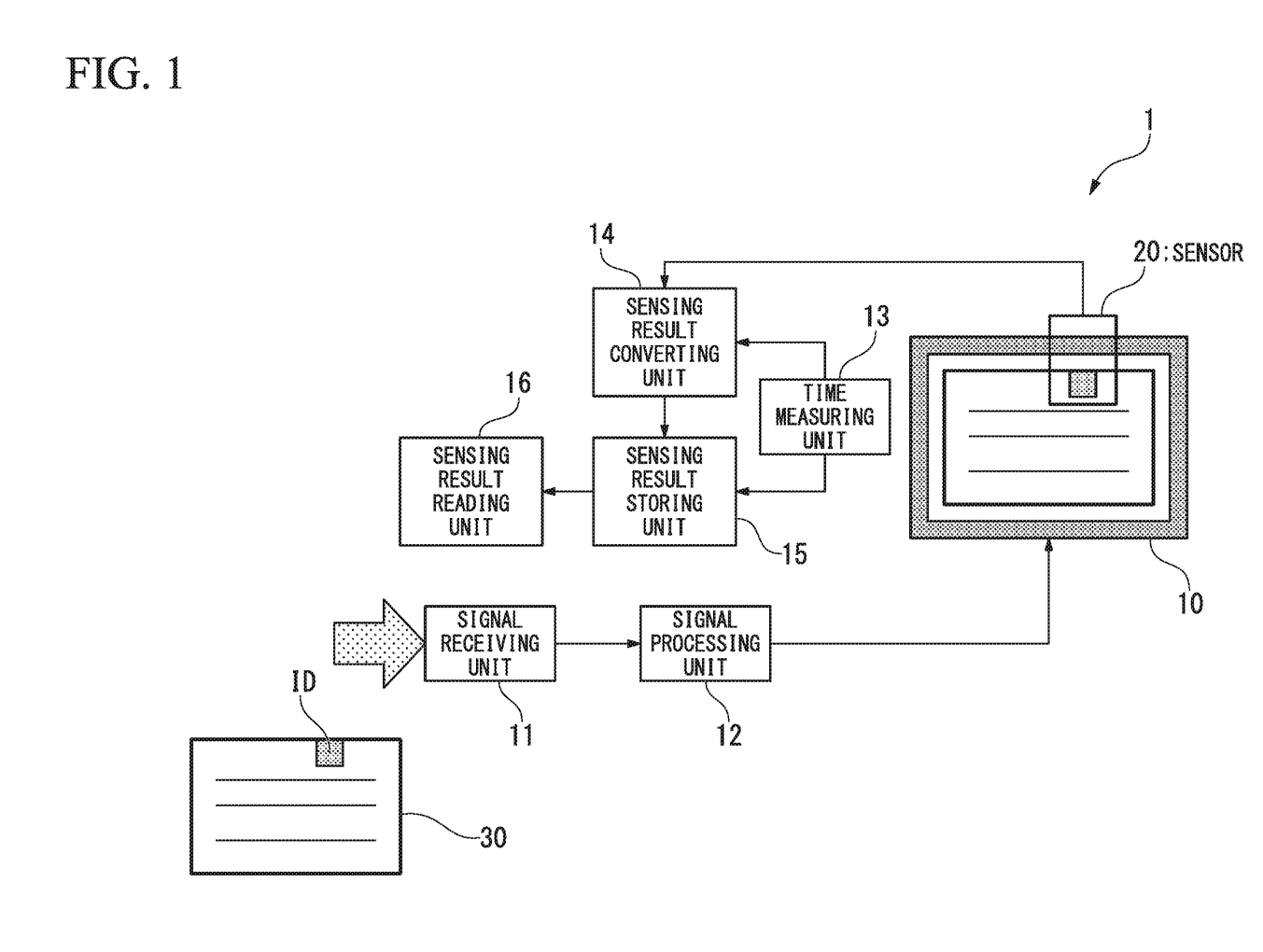
FIG. 1 is a schematic configuration diagram of a display system 1 of the present embodiment.

Hereinafter, embodiments of the present invention will be described in detail with reference to the drawings. FIG. 1 is a schematic configuration diagram of a display system 1 of the present embodiment.

The display system 1 includes a display device 10, a signal receiving unit 11, a signal processing unit 12, a time measuring unit 13, a sensing result converting unit 14, a sensing result storing unit 15, a sensing result reading unit 16, and a sensor 20.

The signal receiving unit 11 externally receives a video 30 to which an ID (video identification information) is added, converts the video 30 into a format that can be easily processed inside the display system 1, and transmits the video 30 to the signal processing unit 12. Also, the ID is an identifier having information for identifying content of the video and is added to the video 30 to identify the video 30.

The signal processing unit 12 performs a signal processing suitable for displaying the video 30 received from the signal receiving unit 11 on the display device 10 and transmits the processed signal to the display device 10.

The display device 10 displays the video 30 received from the signal processing unit 12. At this time, the added ID is also displayed on the screen.

The sensor 20 is installed in the display device 10 in a state in which the sensor 20 is arranged to cover the ID displayed on the display device 10. The sensor 20 detects change in luminance or chromaticity of the ID displayed on the display device 10.

Figure 2:
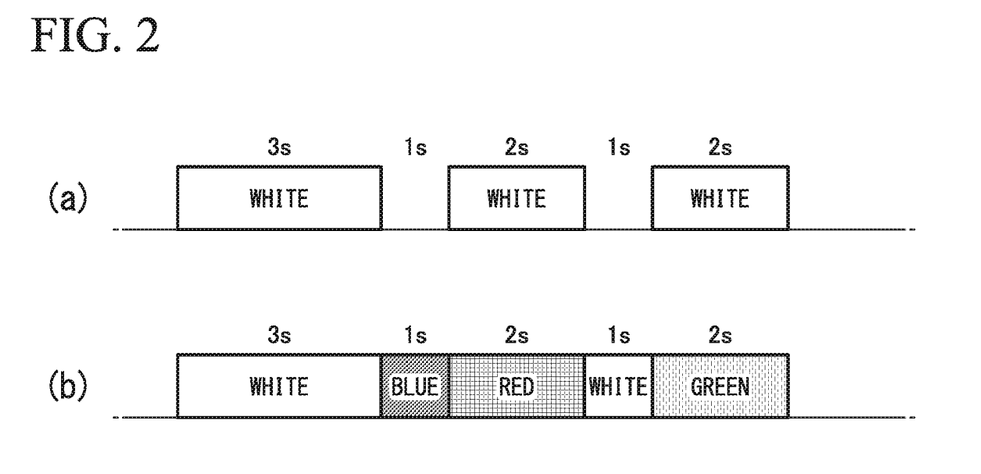
FIG. 2 is a diagram showing an ID.

FIG. 2 is a diagram showing an ID. FIG. 2(*a*) shows the ID when a luminance sensor is used as the sensor 20, and FIG. 2(*b*) shows the ID when a color sensor is used as the sensor 20.

As shown in FIG. 2(*a*), when the sensor includes only a luminance sensor, the ID is represented by only a white signal which has a series of display times of variable length and does not include the other color information to indicate the content of the video. FIG. 2(*a*) shows a state in which the ID varies with times of 3 s (seconds), 1 s, 2 s, 1 s, and 2 s.

As shown in FIG. 2(*b*), when a color sensor is used as the sensor, color information can be added to an ID that varies with time and color information having a bit depth per display unit can be added to the ID. FIG. 2(*b*) shows a state in which the ID varies with times of 3 s of white, 1 s of blue, 2 s of red, 1 s of white, and 2 s of green.

Identification information of an advertiser (advertisement provider) or identification information of content can be placed in the ID. Also, the ID is displayed in a predetermined size at a predetermined position, i.e., in a predetermined region among regions of a displayed video to specify the location of the sensor 20. Also, the ID can be added to the content by the advertisement provider when the advertisement displayer presents information to the advertisement provider or the ID can be added to a video afterwards by the advertisement displayer receiving provided content.

The sensor 20 reads the ID from the display device 10 displaying content including the ID and transmits a reading result to the sensing result converting unit 14 as a signal indicating change in luminance or chromaticity.

The time measuring unit 13 acquires a clock time or a period of time at or during which the video with the added ID was displayed.

The sensing result converting unit 14 converts change in luminance or chromaticity received from the sensor 20 into an ID based on predetermined rules.

Here, the conversion into the ID based on the predetermined rules refers to a process of determining a type of each of ID patterns constituting an ID (e.g., an ID pattern or the like displayed for the initial 3 s in FIGS. 2(*a*) and 2(*b*)) on the basis of the change in luminance or chromaticity and calculating a display time of the ID patterns.

For example, the sensing result converting unit 14 can determine each ID pattern constituting the ID by determining whether the luminance or chromaticity received from the sensor 20 is within one of a plurality of standard ranges preset for the ID patterns.

Also, the sensing result converting unit 14 calculates a display time of each ID pattern. For example, when the above-described determination is performed, the sensing result converting unit 14 can calculate the display time by causing a period of time during which each ID pattern is within one of a plurality of preset standard ranges to correspond to a period of time acquired by the time measuring unit 13.

Also, the sensing result converting unit 14 sequentially transmits the ID patterns constituting the ID and time signals to the sensing result storing unit 15 in order of measurement. Here, the time signal is a display time of each ID pattern constituting the ID.

A state in which the ID patterns constituting the ID are sequentially arranged in order of measurement is a state of the ID into which conversion is made by the sensing result converting unit 14. That is, the sensing result converting unit 14 can convert the change in luminance or chromaticity received from the sensor 20 into the ID added to the video 30. For example, it is possible to perform conversion into an ID whose display time length is variable as shown in FIG. 2(*a*). Also, it is possible to perform conversion into an ID whose display time length is variable and which includes color information based on a result obtained by the color sensor as shown in FIG. 2(*b*).

The sensing result storing unit 15 stores the ID patterns constituting the ID transmitted from the sensing result converting unit 14 and the time signals in a predetermined format in order of transmission.

Also, at this time, the sensing result storing unit 15 is consistent with the time measuring unit 13 and also stores a clock time at which the ID was displayed. The consistence with the time measuring unit 13 means that the time measuring unit 13 acquires a clock time at which the display of the first ID pattern among the ID patterns constituting the ID has been started and the sensing result storing unit 15 stores this clock time as a clock time at which the ID was displayed on the display device 10.

The sensing result reading unit 16 has a configuration capable of reading storage content of the sensing result storing unit 15 at any timing. The sensing result reading unit 16 receives an ID obtained through conversion by the sensing result converting unit 14 by reading ID patterns constituting the ID and time signals in order in which they are stored from the sensing result storing unit 15. For example, the sensing result reading unit 16 receives the ID shown in FIG. 2 from the sensing result storing unit 15.

Also, the sensing result reading unit 16 receives a clock time at which the display of the ID has been started on the display device 10 from the sensing result storing unit 15.

That is, the sensing result reading unit 16 receives the ID obtained through conversion by the sensing result converting unit 14 stored in the sensing result storing unit 15 and the clock time at which the ID was displayed on the display device 10 during a period of time measurement by the time measuring unit 13 and outputs a reception result.

As described above, the display system 1 outputs the ID obtained through the conversion by the sensing result converting unit 14 and the clock time at which the ID was displayed on the display device 10, so that it is possible that the advertisement displayer indicates a clock time at which predetermined content displayed, to the advertisement provider.

A fixed sensor 20 is installed for the display device 10 in the above description of the embodiment, but a part of the content may be concealed in some cases. Thus, it is also possible to use a sensor that can be stored by predetermining the ID display time. In this case, the sensor is normally stored, but may be configured to be connected to the time measuring unit 13 and come out at a determined time to recognize the ID.

That is, the sensor may be installed in the display device 10 and detect the luminance and/or chromaticity at a predetermined time after the start of display of the video.

Figure 3:
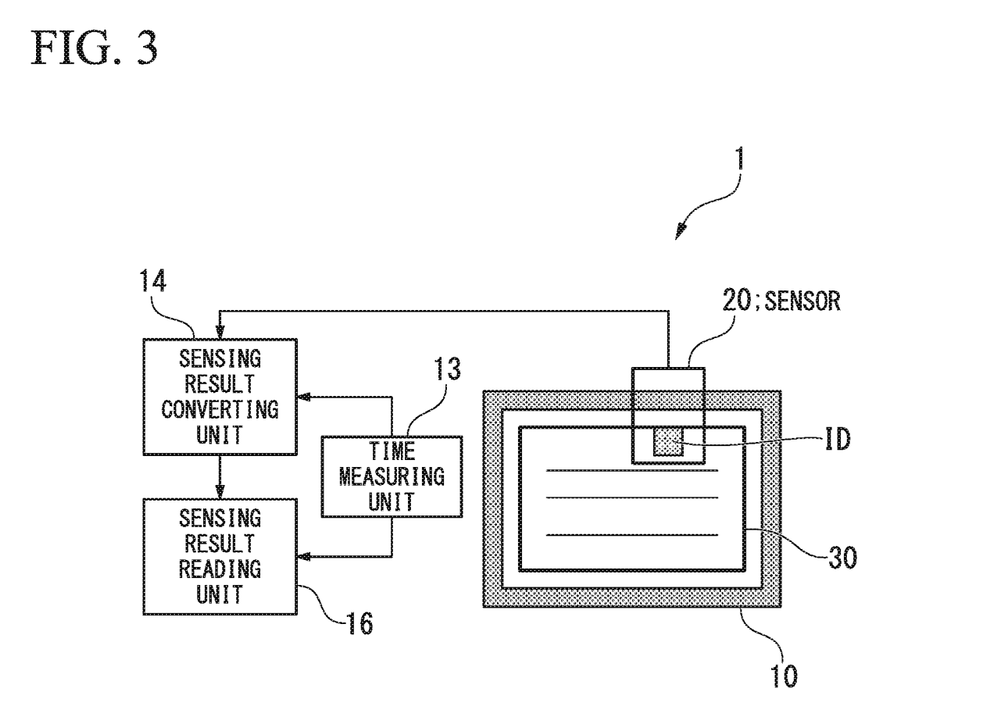
FIG. 3 is a diagram showing a main configuration of the display system 1 shown in FIG. 1.

Next, FIG. 3 is a diagram showing a main configuration of the display system 1 shown in FIG. 1.

As shown in FIG. 3, the display system 1 includes a sensor 20, a time measuring unit 13, a sensing result converting unit 14, and a sensing result reading unit 16.

The sensor 20 is installed in the display device 10 and detects the luminance and/or chromaticity in a predetermined region among regions of the video (video 30) displayed on the display device 10. The sensor 20 is a luminance sensor and detects luminance which varies with time in a predetermined region. Alternatively, the sensor 20 is a color sensor and detects chromaticity which varies with time in a predetermined region.

The sensing result converting unit 14 converts luminance and/or chromaticity into an ID (video identification information for identifying the video).

The time measuring unit 13 acquires a clock time or a period of time at or during which the video having the added ID was displayed.

The sensing result reading unit 16 outputs the ID and the clock time or the period of time.

Thereby, according to the display system 1 of the present embodiment, an ID (video identification information) identifying the video 30 and indicating details of content of the video 30 is added to the video 30, so that it is possible to perform the verification of display content without using a camera that is necessary to be installed external, by replacing the camera with a cheap small sensor 20. Because the correctness of the display content can be determined from the ID into which conversion is made by the sensing result converting unit 14 on the basis of the detection result of the sensor 20 and the clock time at which the ID was displayed on the display device 10, it is unnecessary to confirm a video and the time required for verification can be shortened. Thereby, it is possible to provide the display system 1 and a method of controlling the display system 1 that can reduce the manufacturing cost and shorten the time required for verifying the correctness of the display content.

Although embodiments of the present invention have been described in detail above with reference to the drawings, specific configurations are not limited to the embodiments, and changes in design, etc. may also be included without departing from the scope of the present invention.

For example, it is also possible to automatically provide information to the advertisement displayer or the advertisement provider in a method of connecting the sensing result reading unit 16 to the cloud or the like.

When an automatic transmission means by connecting to the cloud or the like is used in the sensing result reading unit 16, it is also possible to automatically transmit without having the sensing result storing unit 15.

Also, in the above description of the embodiment, for the sake of convenience, a signal used for the ID uses fixed amplitude (luminance). It is also possible to change this amplitude to further increase an amount of information. For example, by expressing 8 gradations, information of 3 bits can be added.

In the above description of the embodiment, the sensor 20 is assumed to be installed in the display device 10 within the display system 1. However, a method of externally connecting the sensor 20 and realizing the conversion of the sensing result converting unit 14 and the storage of the sensing result storing unit 15 by a personal computer (PC) is also conceivable.

Next, a display system 1A obtained by embodying the display system 1 will be described.

Figure 4:
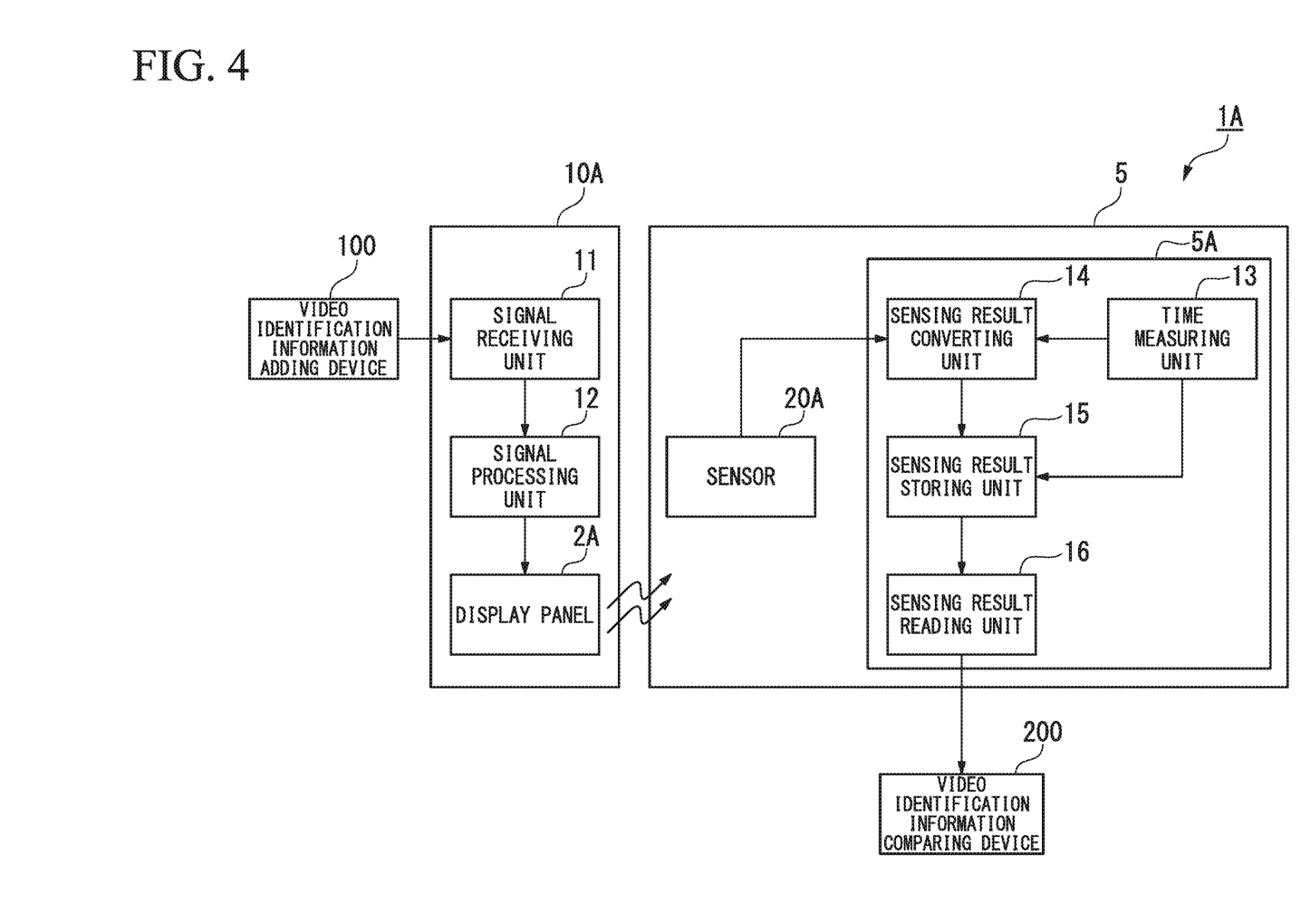
FIG. 4 is a schematic configuration diagram of a display system 1A of the present embodiment.

FIG. 4 is a schematic configuration diagram of a display system 1A of the present embodiment. In FIG. 4, the same parts as those in FIG. 1 are denoted by the same reference signs, and a description thereof will be omitted here.

The display system 1A includes a video identification information adding device 100, a display device 10A, a sensor-equipped module 5 (video signal monitoring device), and a video identification information comparing device 200.

The display device 10A is configured to include a signal receiving unit 11, a signal processing unit 12, and a display panel 2A.

The sensor-equipped module 5 includes a sensor 20A and a sensing module 5A. The sensing module 5A is configured to include a time measuring unit 13, a sensing result converting unit 14, a sensing result storing unit 15, and a sensing result reading unit 16.

The video identification information adding device 100 is arranged outside the display device 10A, adds an ID for distinguishing content to the advertisement content displayed on the display device 10A, and transmits the video 30 with the added ID to the signal receiving unit 11 of the display device 10A. The video identification information adding device 100 may be a PC that transmits the video 30 to one display device 10A or a server that transmits the video 30 to two or more display devices 10A.

Here, an arrangement for the display device 10A of the sensor-equipped module 5 will be described with reference to FIGS. 5 and 6.

Figure 5:
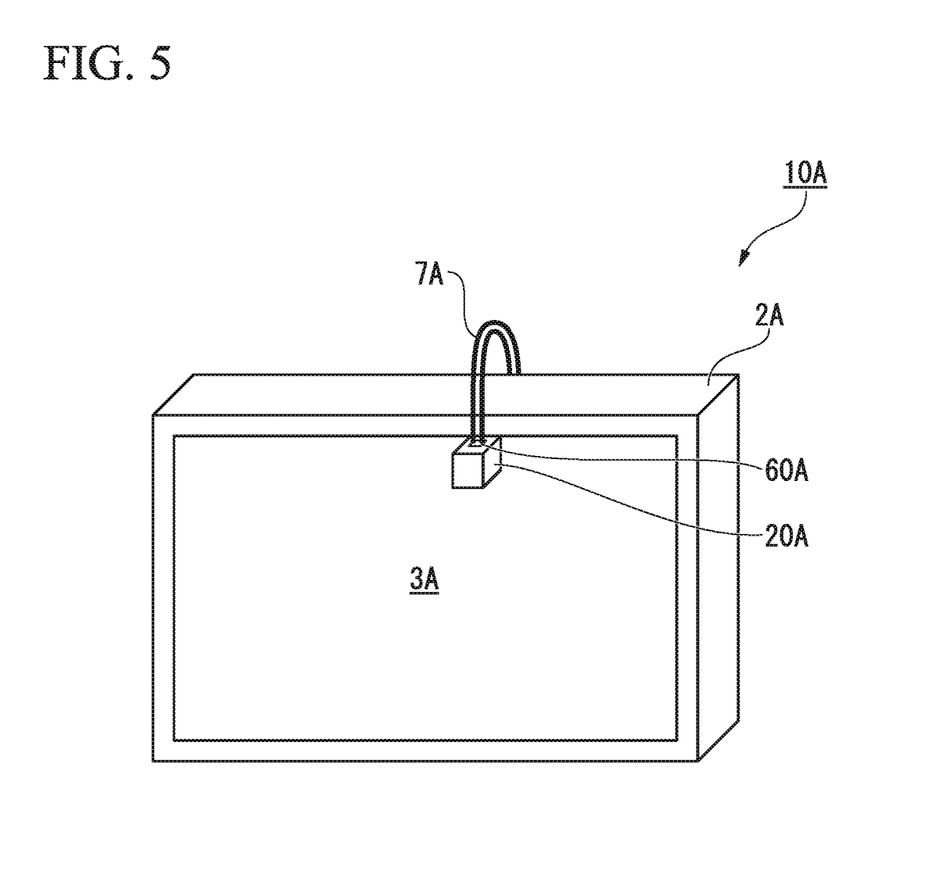
FIG. 5 is a perspective view when a display device according to an embodiment of the present invention is viewed from a front side of a display surface.

FIG. 5 is a perspective view when the display device 10A according to an embodiment of the present invention is viewed from a front side of a display surface. Also, FIG. 6 is a perspective view when the display device of FIG. 5 is viewed from a rear side of the display surface.

The display panel 2A in the display device 10A has a display surface 3A for displaying the video 30 on the front surface.

The sensor 20A is arranged to cover an end region of the display surface 3A of the display panel 2A (a fixed region including outermost pixels of the display panel 2A). Also, the sensor 20A has a connector 60A and is connected to a connector 61A of a sensing module 5A arranged on the rear side of the display panel 2A shown in FIG. 6 via a cable 7A. The connector 61A is connected to the sensing result converting unit 14 through the internal wiring within the sensing module 5A, and the ID detected by the sensor 20A is input to the sensing result converting unit 14.

The sensing module 5A can be inserted into and extracted from a slot 8 formed in the display panel 2A. An insertion/extraction direction AB of the sensing module 5A for the slot 8 is a direction orthogonal to a thickness direction W of the display panel 2A. The sensing module 5A is electrically connected to power supply wiring within the display device 10A in a state in which the sensing module 5A is inserted into the slot 8, and the sensing result converting unit 14 and the like become operable.

The sensing module 5A includes a connector 62A. For example, the sensing result reading unit 16 outputs the ID result and the time information to the video identification information comparing device 200 through a LAN cable (not shown in FIG. 6) connected to the connector 62A. Of course, the sensing result reading unit 16 may perform transmission to the video identification information comparing device 200 according to wireless transmission.

Also, the sensing module 5A may be installed outside the display device 10A without being inserted into the slot 8. In this case, it can be electrically connected to power supply wiring from an external power supply device outside the display device 10A, and the sensing result converting unit 14 and the like are then operable.

Also, when the display device includes a multi-display device in which a plurality of (m rows×n columns (m and n are natural numbers)) display devices 10A are connected in a daisy chain manner, the sensor 20A may be configured to be arranged at the end of the display surface 3A of the display panel 2A of at least one of the (m×n) display devices.

Figure 6:
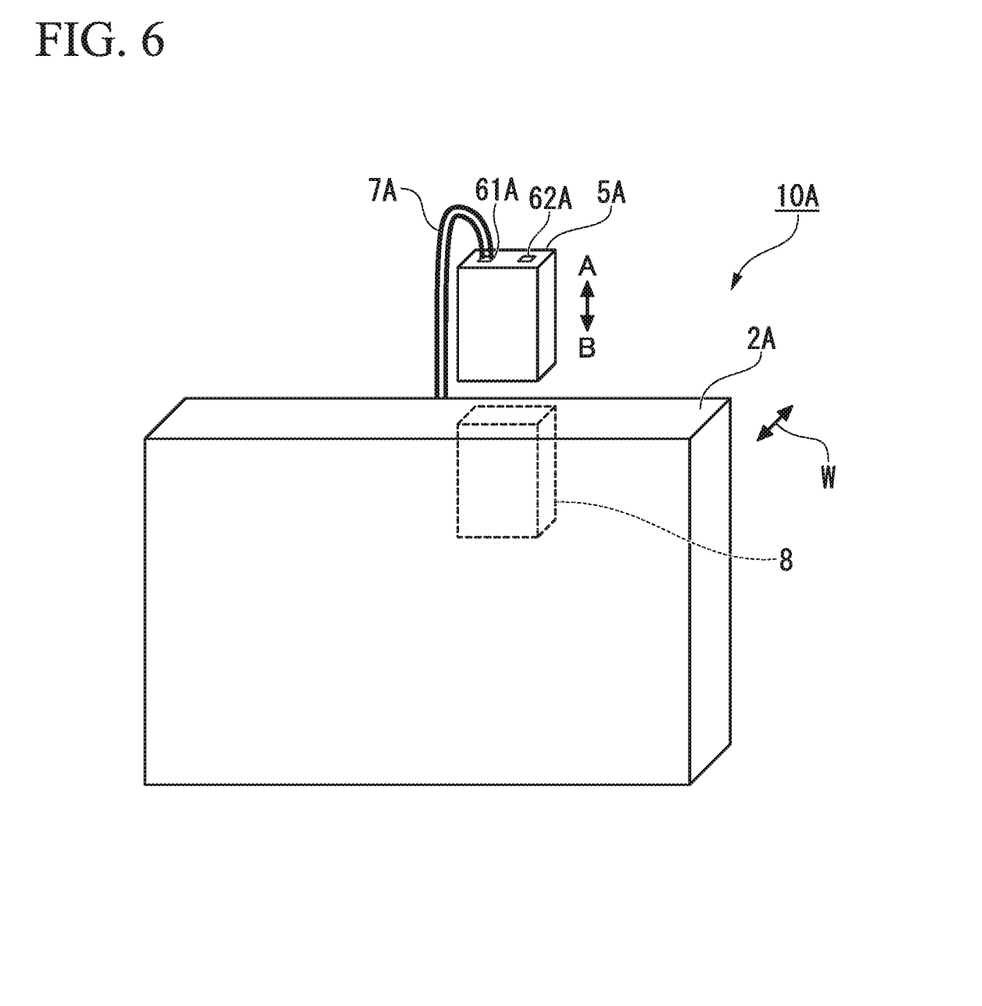
FIG. 6 is a perspective view when the display device of FIG. 5 is viewed from a rear side of the display surface.

Also, for example, a configuration in which a function of the sensing module 5A is installed on a function expansion module that extends a function of the display device 10A as an open pluggable specification (OPS), and the function expansion module is inserted/extracted in the method shown in FIG. 6 may be adopted. Also, for example, when a substrate of a small computer such as Raspberry Pi is inserted into the display device 10A, a substrate of the sensing module 5A may be inserted.

Returning to FIG. 4, the video identification information comparing device 200 includes, for example, a PC, and determines whether or not the video 30 has been displayed on the display device 10A on the basis of whether the ID obtained in the sensing result reading process performed by the sensing result reading unit 16 and the clock time at which the ID was displayed on the display device 10A match an ID added to the video 30 displayed on the display device 10A by the video identification information adding device 100 and a scheduled display clock time of the added ID.

Also, the sensing result reading unit 16 writes the ID obtained in the sensing result reading process and the display clock time of the ID to a USB memory connected to the sensing result reading unit 16 by a universal serial bus (USB) cable. On the basis of whether the written ID and the written clock time at which the ID was displayed match the ID added to the video 30 by the video identification information adding device 100 and the scheduled display clock time of the added ID, the video identification information comparing device 200 may be configured to determine whether or not the video 30 has been displayed on the display device 10A.

Figure 7:
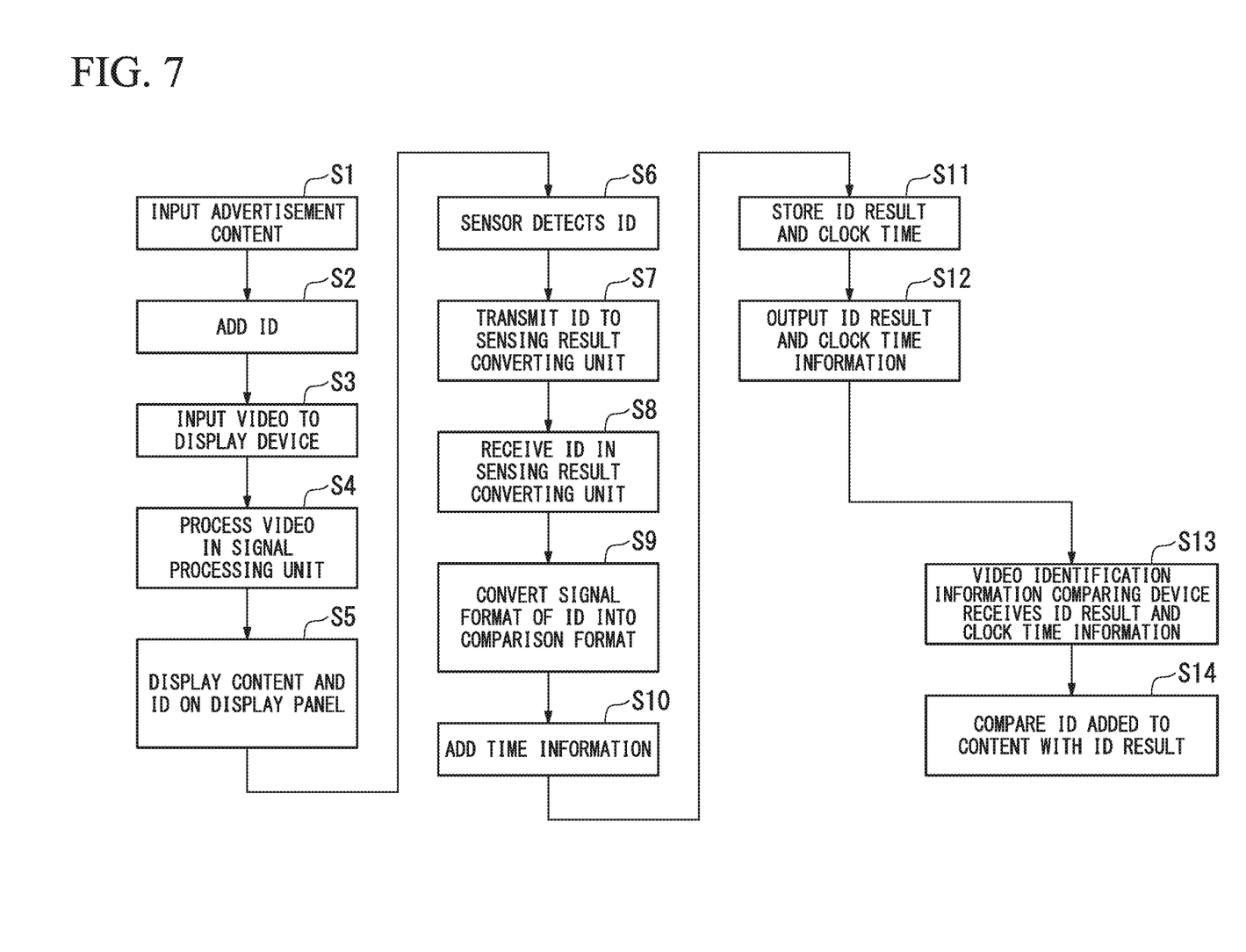
FIG. 7 is a flowchart of a process of the display system 1A of the present embodiment.

Next, a control process in the display system 1A will be described. FIG. 7 is a flowchart of a process of the display system 1A of the present embodiment.

Advertisement content is input to the video identification information adding device 100 (step S1).

The video identification information adding device 100 adds an ID for distinguishing the advertisement content to the advertisement content (step S2).

The advertisement content (video 30) to which the ID output from the video identification information adding device 100 has been added is input to the signal receiving unit 11 of the display device 10A (step S3).

The signal processing unit 12 of the display device 10A processes the video 30 (step S4).

The video 30 including the advertisement content and the ID for distinguishing the advertisement content is displayed on the display panel 2A of the display device 10A (step S5).

The sensor 20A detects the ID (step S6).

The sensor 20A transmits the detected ID to the sensing result converting unit 14 (step S7).

The sensing result converting unit 14 receives the ID detected by the sensor 20A (step S8).

The sensing result converting unit 14 converts a signal format of the ID into a comparable signal format similar to that of an ID superimposed on original advertisement content (step S9). This is assumed to be an ID result.

The sensing result converting unit 14 adds time information from the time measuring unit 13 to the ID result (step S10).

The sensing result storing unit 15 stores the ID result and clock time information (step S11).

The sensing result reading unit 16 outputs the ID result and the clock time information (step S12).

The video identification information comparing device 200 receives the ID result and the clock time information (step S13).

The video identification information comparing device 200 compares the ID added to the content by the video identification information adding device 100 with the ID result (step S14). Thereby, it can be confirmed whether or not the advertisement content has been correctly displayed on the display device 10A.

Next, a display system 1B obtained by embodying the display system 1 will be described.

Figure 8:
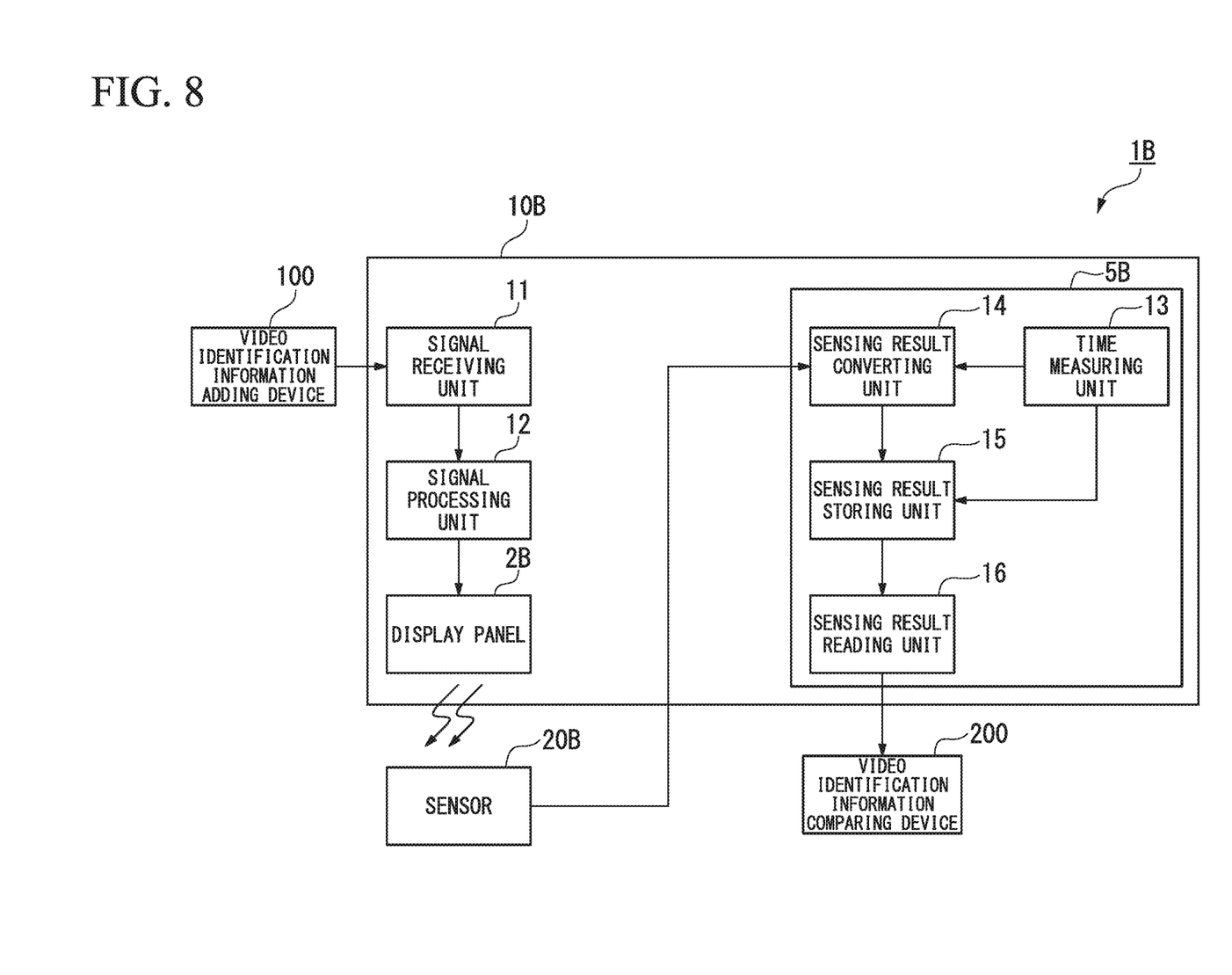
FIG. 8 is a schematic configuration diagram of a display system 1B of the present embodiment.

FIG. 8 is a schematic configuration diagram of a display system 1B of the present embodiment. In FIG. 8, the same parts as those in FIG. 4 showing the display system 1A are denoted by the same reference signs, and a description thereof will be omitted.

The display system 1B is configured to include a video identification information adding device 100, a display device 10B (display device), and a video identification information comparing device 200.

The display device 10B is configured to include a signal receiving unit 11, a signal processing unit 12, a display panel 2B, and a sensing module 5B.

The sensing module 5B has the same configuration as the sensing module 5A shown in FIG. 4 and is configured to include a time measuring unit 13, a sensing result converting unit 14, a sensing result storing unit 15, and a sensing result reading unit 16. Unlike the sensing module 5A shown in FIG. 4, the sensing module 5B is incorporated in the display device 10B.

Here, an arrangement for the display device 10B of a sensor 20B will be described with reference to FIG. 9.

Figure 9:
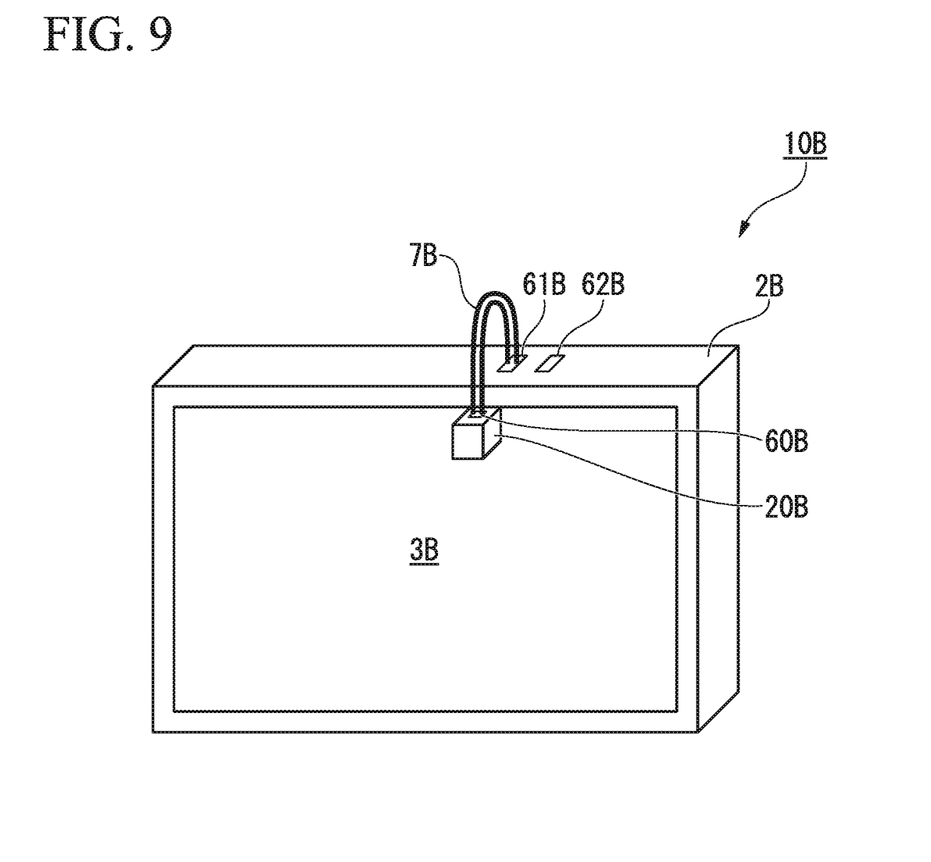
FIG. 9 is a perspective view when a display device according to an embodiment of the present invention is viewed from a front side of a display surface.

FIG. 9 is a perspective view when the display device 10B according to an embodiment of the present invention is viewed from a front side of a display surface.

The display panel 2B of the display device 10B has a display surface 3B for displaying the video 30 on the front surface.

The sensor 20B is arranged to cover an end region of the display surface 3B of the display panel 2B (a fixed region including outermost pixels of the display panel 2B). The sensor 20B has a connector 60B and is connected to a connector 61B of the display panel 2B shown in FIG. 9 via a cable 7B. The connector 61B is connected to the sensing result converting unit 14 through the internal wiring in the display device 10B, and the ID detected by the sensor 20B is input to the sensing result converting unit 14.

The display panel 2B has a connector 62B. The sensing result reading unit 16 is connected to the video identification information comparing device 200 by, for example, a LAN cable (not shown in FIG. 9) connected to the connector 62B, and outputs an ID result and a clock time information to the video identification information comparing device 200.

Thereby, it can be confirmed whether or not advertisement content has been correctly displayed on the display device 10B.

In the display system 1A, the video signal monitoring device including the sensor 20A and the sensing module 5A is configured to be externally attached to the display device 10A. Also, in the display system 1B, the sensing module 5B is inside the display device 10B, and the sensor 20B is configured to be externally attached to the display device 10A. In contrast to these, in the display system, the display device may be configured to incorporate the sensor and the sensing module.

Also, the sensing result converting process to be performed by the sensing result converting unit 14 and the sensing result reading process to be performed by the sensing result reading unit 16 in the control systems of the display systems 1, 1A, and 1B may be performed by recording a program for realizing functions of the display systems 1, 1A, and 1B in FIG. 1 on a computer-readable recording medium and causing a computer system to read and execute the program recorded on the recording medium. Also, the "computer system" used here is assumed to include an operating system (OS) and hardware such as peripheral devices.

Also, the "computer system" is assumed to include a World Wide Web (WWW) system having a homepage providing environment (or displaying environment).

Also, the "computer-readable recording medium" refers to a storage apparatus including a flexible disk, a magneto-optical disc, a read only memory (ROM), or a portable medium such as a compact disc (CD)-ROM, a hard disk embedded in the computer system, and the like. Furthermore, the "computer-readable recording medium" is assumed to include a medium that holds a program for a fixed period of time, such as a volatile memory (random access memory (RAM)) inside a computer system serving as a server or a client when the program is transmitted via a network such as the Internet or a communication circuit such as a telephone circuit. Also, the above-described program may be a program for implementing some of the above-described functions. Further, the above-described program may be a program capable of implementing the above-described functions in combination with a program already recorded on the computer system.

INDUSTRIAL APPLICABILITY

According to the present invention, it is possible to provide a video signal monitoring method or the like capable of confirming whether or not advertisement content has been correctly displayed on a video display device.

REFERENCE SYMBOLS 1, 1A, 1B Display system
2A, 2B Display panel
3A, 3B Display surface
5 Sensor-equipped module
5A, 5B Sensing module
10, 10A, 10B Display device
11 Signal receiving unit
12 Signal processing unit
13 Time measuring unit
14 Sensing result converting unit
15 Sensing result storing unit
16 Sensing result reading unit
20, 20A, 20B Sensor
30 Video
100 Video identification information adding device
200 Video identification information comparing device

The invention claimed is:

1. A video signal monitoring method, comprising:
   detecting at least one of luminance or chromaticity in a predetermined region among regions of a video displayed on a display device;
   converting the at least one of detected luminance or chromaticity into video identification information for identifying the video; and
   outputting the video identification information and a time at which the video was displayed.

2. The video signal monitoring method according to claim 1, further comprising:
   determining whether or not the video has been displayed on a basis of whether or not the video identification information and the time obtained in the outputting match video identification information added to the video displayed on the display device and a scheduled display time of the added video identification information, respectively.

3. The video signal monitoring method according to claim 1, wherein the detecting is performed by a sensor installed in the display device.

4. The video signal monitoring method according to claim 3, wherein the sensor comprises a luminance sensor and detects luminance that varies with time in the predetermined region.

5. The video signal monitoring method according to claim 3, wherein the sensor comprises a color sensor and detects chromaticity that varies with time in the predetermined region.

6. The video signal monitoring method according to claim 3, wherein the sensor detects the at least one of luminance or chromaticity at a predetermined period of time after a start of display of the video.

7. A video signal monitoring device, comprising:
   a sensing result converting unit configured to convert at least one of luminance or chromaticity, in a predetermined region among regions of a video displayed on a display device, into video identification information for identifying the video;
   a time measuring unit configured to acquire a time or a period of time at or during which the video was displayed; and
   a sensing result reading unit configured to output the video identification information and the time or the period of time.

8. The video signal monitoring device according to claim 7, further comprising:
   a video identification information determining unit configured to determine whether or not the video has been displayed on a basis of whether or not the video identification information and the time obtained by the sensing result reading unit match video identification information added to the video displayed on the display device and a scheduled display time of the added video identification information, respectively.

9. The video signal monitoring device according to claim 7, wherein the sensing result converting unit receives the at least one of luminance or chromaticity from a sensor installed in the display device.

10. The video signal monitoring device according to claim 7, further comprising a sensor configured to detect the at least one of luminance or chromaticity.

11. The video signal monitoring device according to claim 9, wherein the sensor comprises a luminance sensor and detects luminance that varies with time in the predetermined region.

12. The video signal monitoring device according to claim 9, wherein the sensor comprises a color sensor and detects chromaticity that varies with time in the predetermined region.

13. The video signal monitoring device according to claim 9, wherein the sensor detects the at least one of luminance or chromaticity at a predetermined period of time after a start of display of the video.

14. A display device, comprising:
a display unit configured to display a video;
a sensing result converting unit configured to convert at least one of luminance or chromaticity, in a predetermined region among regions of the displayed video, into video identification information for identifying the video;
a time measuring unit configured to acquire a time or a period of time at or during which the video was displayed; and
a sensing result reading unit configured to output the video identification information and the time or the period of time.

15. The display device according to claim 14, further comprising:
a video identification information determining unit configured to determine Whether or not the video has been displayed on a basis of whether or not the video identification information and the time obtained by the sensing result reading unit match video identification information added to the displayed video and a scheduled display time of the added video identification information, respectively.

16. The display device according to claim 14, wherein the sensing result converting unit receives the at least one of luminance or chromaticity from a sensor.

17. The display device according to claim 14, further comprising a sensor configured to detect the at least one of luminance or chromaticity.

18. The display device according to claim 16, wherein the sensor comprises a luminance sensor and detects the luminance that varies with time in the predetermined region.

19. The display device according to claim 16, wherein the sensor comprises a color sensor and detects the chromaticity that varies with time in the predetermined region.

20. The display device according to claim 16, wherein the sensor detects the at least one of luminance or chromaticity at a predetermined period of time after a start of display of the video.

* * * * *